May 12, 1925.
E. BERG
HEADLIGHT
Filed May 24, 1924
1,537,219
2 Sheets-Sheet 1
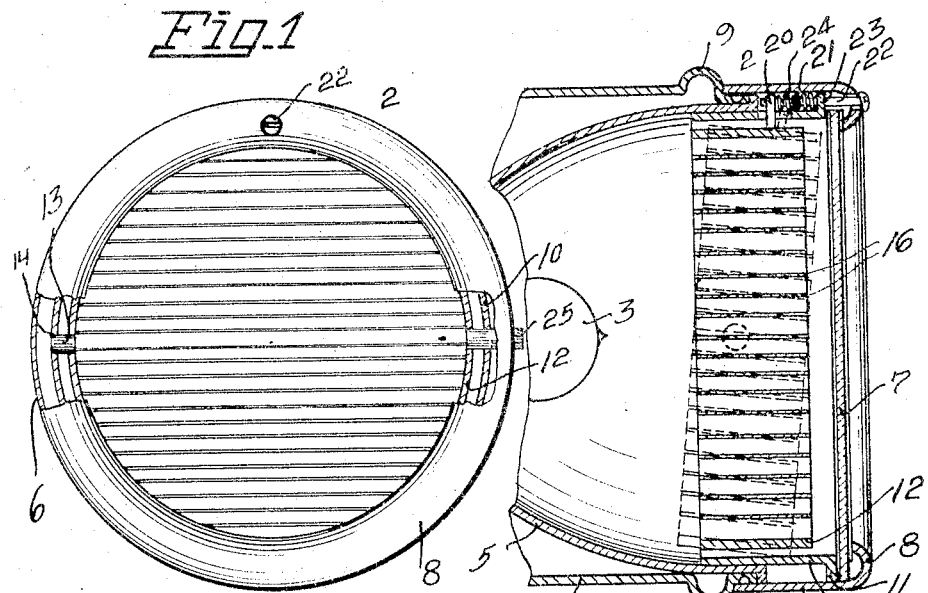
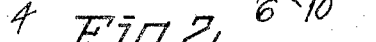
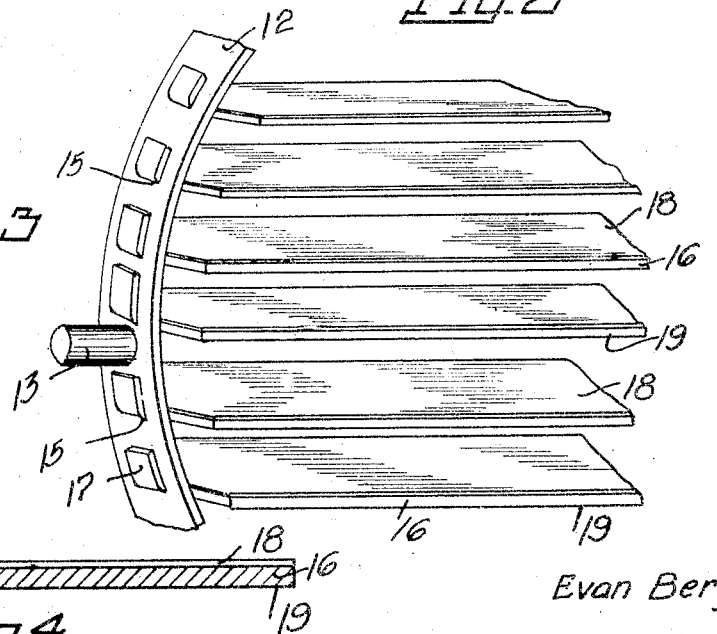
Inventor
Evan Berg
By Herbert E. Smith
Attorney Inventor
Evan Berg By Herbert E. Smith
Attorney Patented May 12, 1925.

1,537,219

UNITED STATES PATENT OFFICE.

EVAN BERG, OF SPOKANE, WASHINGTON.

HEADLIGHT.

Application filed May 24, 1924. Serial No. 715,547.

*To all whom it may concern:*

Be it known that I, EVAN BERG, a citizen of the United States, residing at Spokane, in Spokane County and State of Washington, have invented certain new and useful Improvements in Headlights, of which the following is a specification.

My present invention relates to improvements in headlights for automotive vehicles and designed to project the greater part of the light emanating from the lamp within the casing in a concentrated beam for the purpose of illuminating the roadway in front of a vehicle, and to divert the light rays for the purpose of avoiding the dangers resulting when the light rays are directed on a line with the eyes of a pedestrian, or on a level with the eyes of the driver of an approaching automobile on the roadway.

The device is capable of attachment to existing headlights of standard construction already in use, and may be manufactured as a part of a headlight for the market.

In carrying out my invention I utilize a series of parallel reflector slats carried in an adjustable ring or band movable on a horizontal axis and located between the front lens and reflector or reflecting plate within the headlight.

Means are provided for retaining the reflecting slats in permanent adjusted position in order that the headlight may comply with traffic laws relating to illumination, and means operable from the dash board of the automobile by the driver are also provided for changing the position of the reflecting slats when required.

The invention consists in certain novel combinations and arrangements of parts as will hereinafter be more fully set forth and claimed.

In the accompanying drawings I have illustrated one complete example of the physical embodiment of my invention wherein the parts are combined and arranged in accordance with the best mode I have thus far devised for the practical application of the principles of my invention.

Figure 1 is a view in front elevation of a headlight embodying my invention, parts being broken away for convenience of illustration.

Figure 2 is a longitudinal vertical sectional view at the front part of a headlight showing the relation thereto of the reflecting slats and their connections.

Figure 3 is an enlarged perspective view of a part of the light deflecting device.

Figure 4 is a detail sectional view of a part of one of the light deflecting slats.

Figure 5:
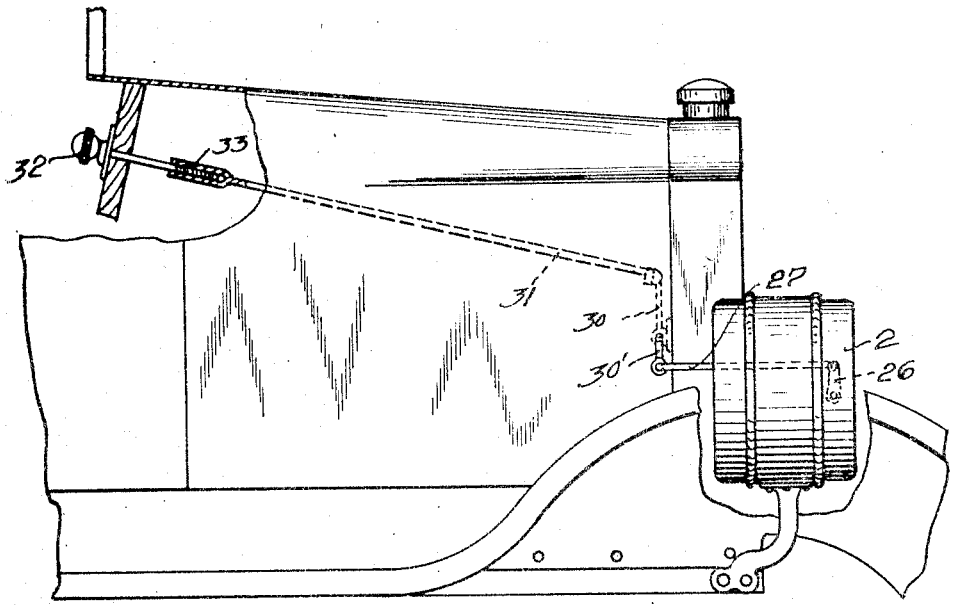
Figure 5 is a view in side elevation at the front of an automobile showing the connections to the dash board for operating the light deflector.
Figure 6:
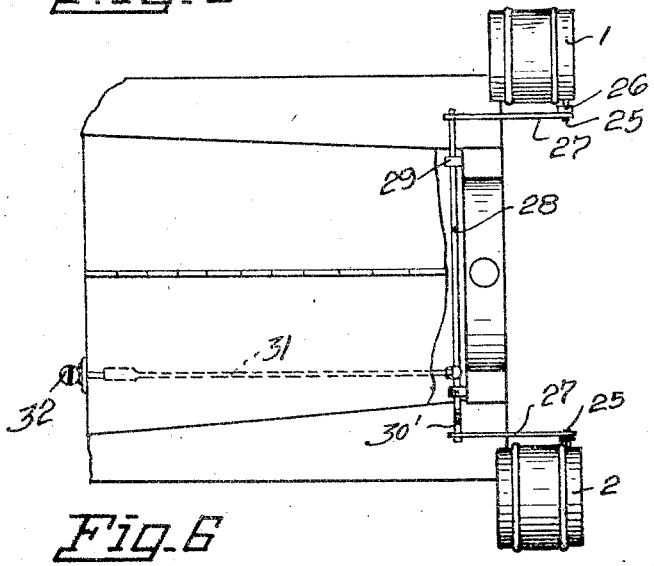
Figure 6 is a top plan view illustrating the connection between two headlights and the actuating means for turning or adjusting the slats therein.

In Figure 6 two headlights 1 and 2 are illustrated which are of standard or well known type and are carried at suitable locations at the front of the automobile. The usual electric lamp 3 is enclosed within the outer casing 4, and a reflector 5 is enclosed within the casing and positioned with relation to the lamp for directing the light rays therefrom toward the front of the headlight in which is located the light-ray deflecting device.

At the front of the headlight, which is shown as cylindrical is located an extension ring 6, a rear portion of which encircles the front of the casing 4, and this extension ring carries a lens 7 of suitable type, which is retained by the annular, exterior bead 8 of the extension ring. The extension ring may be secured in any approved manner on the outer periphery of the casing and the rear end of the sleeve or ring 6 frictionally engages an annular semi-circular bead or rib 9 on the exterior of the casing, with suitable means for fastening these parts together.

Within the open front of the headlight casing I locate a bearing sleeve 10 which frictionally engages the inner face of the reflector 5, and the sleeve is fashioned at its front with an annular, exterior flange 11 which at its outer edge engages the inner cylindrical face of the extension ring 6. The front face of this flange affords a seat for the lens and it will be apparent that the inner bearing ring, outer extension ring and lens, together with the bead 8 and flange 11 form a well braced and rigid head for the casing of the headlight.

The light deflecting device is located within this head at a point where the effectiveness of the reflector plate 5 decreases to a minimum in order that the maximum reflecting properties of the reflector may be utilized in connection with the light deflecting device. The light deflecting device includes an adjustable supporting ring 12 within the bearing ring having exterior axially alined horizontal trunnions 13 and 25 projecting diametrically from opposite sides of the ring and journaled at 14 in the bearing ring.

As best seen in Figure 3 the ring 12 is provided with two series of slots 15 arranged in horizontal and alined pairs at opposite sides of the ring and between these pairs of slots the reflecting slats 16 are carried. The ends of the slats 17 are reduced in width and passed through the complementary slots and then bent upwardly flat against the exterior face of the ring in order that the slats are anchored in fixed relation to the ring and turn with the latter.

These slats are arranged in parallelism and extend horizontally across the front of the headlight but back of the lens. They are spaced equidistant apart and their upper faces 18 are treated in such manner as to render them non-reflecting surfaces for light rays emanating from the lamp 3. A coating or finish of non-reflecting material as indicated in the enlarged detail view of Figure 4 by the numeral 18 is applied in suitable manner to the upper surfaces of the slats.

The lower surfaces of all the slats, as 19, are polished, nickeled or silvered or made reflecting surfaces in other suitable manner, and these surfaces are designed to receive light rays and deflect them in a generally downward direction. The light rays reflected from the conoidal reflector 5 are directed to the underside of the slats, and then the rays in turn are reflected from these surfaces 19 and directed through the front of the headlight by way of the lens.

As the angle of reflection is equal to the angle of incidence it will be apparent that light rays emanating from various parts of the reflector 5 will be reflected from the slats, some a short distance or directly downward in front of the headlight striking the ground or roadway slightly in advance of the vehicle, and other light rays will be projected farther ahead, but downwardly. The major portion of the light from the lamp will thus be reflected by the slats, while a portion of the light may pass directly through the spaces between the slats. The light that is directed straight ahead in a horizontal plane is, however, dimmed, and not sufficient to interfere with the vision or dazzle the eyes of a pedestrian or of the driver of an approaching automotive vehicle.

The supporting ring may be swung on its trunnions to vary the position of the reflecting surfaces of the slats with relation to the reflector 5 for the purpose of changing the angle of the reflected light rays as they strike the ground in front of the headlight.

A permanent or stationary adjustment of the supporting ring and slats may be accomplished by the following means. At the top of the supporting ring a vertical and radially disposed perforated lug 20 is fixed, which projects upwardly from the exterior annular surface of the ring and through a slot 21. This slot is located in the bearing ring 10 and extends longitudinally thereof immediately in front of the flanged front edge of the reflector 5, and back of the flange 11 of the extension sleeve 10. The slot is of sufficient length to permit the lug to move therein as the supporting ring is turned on its trunnions.

An adjusting screw 22 is utilized for turning the supporting ring, and said screw is journaled at 23 in the flange 11 of the extension sleeve 10 and extends through the perforated lug 20. The screw is threaded in the lug and has a loose bearing in the bead 8 and flange 11, and a spring 24 which is interposed between the lug and flange and coiled about the screw is compressed when the screw is turned to swing the supporting ring on its trunnions. The head of the screw on the exterior of the bead 8 resists the tendency of the spring to return the supporting ring to vertical position. Thus by turning the screw in the perforated lug, which performs the functions of a nut, the supporting ring may be turned on its trunnions with the upper half to the front of the vertical axis of the ring and the lower half to the rear of the vertical axis. The spring affords a resilient means to prevent excessive movement of the supporting ring and retains the ring in adjusted position.

For additional adjustment of the supporting ring and its reflecting slats means operated from the front or dash board of the vehicle are connected with a projecting trunnion 25 of each of the headlights, said trunnions projecting inwardly toward the longitudinal center of the vehicle. Each trunnion 25 is provided with a crank arm 26 and link 27, and these links which extend rearwardly of the vehicle are connected at the respective ends of a transversely disposed crank rod 28 supported to turn in its bearings 29 fixed to a suitable portion of the vehicle.

The crank rod or shaft 30 is provided with a lever arm, and this arm is connected to a draw rod 31 having a head or knob 32 at the dash board and convenient for access by the driver of the car. An extension joint 33 is provided in the draw rod to adjust the rod to its proper length, and it will be apparent that by pulling on the knob or handle 32, slightly, the crank rod or shaft may be turned. The turning movement of the crank rod is transmitted to the links and crank arms and thence to the trunnions, and as the latter are swung in their bearings the supporting ring and its reflecting slats are tilted as indicated by dotted lines in Figure 2. By this adjustment the slats may be turned to position to entirely shut off transmission of light rays or nearly so, should such condition be desired. When actuated from the knob 32 the supporting ring is moved against the tension of the spring 24, and when the knob is released the spring will return the supporting ring to its original position. This original position may be the vertical position, or the original position may be the adjusted position secured by manipulating the screw 22.

As before stated the device is applicable as an attachment for lamps now in use, and the head above described may be applied to circular lamps, or when made up in different forms the head may be applied to lamps of other shapes. In the production of new lamps the head is manufactured as a part of the unit. The number of slats used may be varied, and the manner of securing them in the supporting ring may be changed, or the supporting ring may be fashioned in a pair of sections with the slats firmly fixed at their ends to these sections.

Having thus fully described my invention, what I claim as new and desire to secure by Letters Patent is—

1. The combination with a headlight and a bearing sleeve therein, of a ring having trunnions journaled in the sleeve, fixed parallel horizontally disposed slats in said ring each having an upper non-reflecting face and a lower reflecting surface, and means for adjusting and retaining said ring in a tilted position, and additional means for tilting beyond the adjusted position.

2. The combination with a headlight and a slotted bearing sleeve therein having an annular flange, of a ring having trunnions journaled in said sleeve, a threaded lug on the ring movable in the slotted bearing sleeve, an adjusting screw for engagement with said lug to turn the ring, and a spring for affording a resilient retaining device for the ring.

3. The combination with a headlight and a slotted bearing sleeve therein having an exterior annular flange, of a ring journaled to swing in said sleeve and reflecting slats carried by said ring, a threaded lug on the ring forming a nut and movable in the slotted sleeve, a screw supported in the flange of the sleeve and operatively connected with said nut, and a spring interposed between said nut and flange.

4. The combination with a pair of headlights each having a bearing ring, of a pair of supporting rings having trunnions journaled in the bearing ring and reflecting devices carried by the supporting ring, resilient means on the bearing ring for retaining said ring in adjusted position, a crank arm on each of the adjoining trunnions, a crank shaft and links connecting the shaft and arms, a lever on the shaft, and a draw rod for actuating the lever.

5. The combination with a slotted bearing sleeve having an exterior annular flange, of a ring journaled to swing in said sleeve and reflecting slats carried by said ring, means for tilting said ring, resilient means for retaining the ring in tilted position, and additional means for tilting said ring against the tension of the spring.

6. In a headlight the combination with an outer casing having an annular exterior bead, of a bearing sleeve within the casing, a ring pivoted in the bearing sleeve and means for adjusting said ring, light reflecting slats in the ring, a front extension sleeve on the casing engaging said bead, an annular bead on the extension, an annular flange on the bearing sleeve, and a lens retained between said flange and the last mentioned bead.

In testimony whereof I affix my signature.

EVAN BERG.